United States Patent [19]

Charpak

[11] Patent Number: 5,223,717
[45] Date of Patent: Jun. 29, 1993

[54] IMAGING DEVICE FOR IONIZING RADIATION

[76] Inventor: George Charpak, 37 Rue de la Plaine, 75020 Paris, France

[21] Appl. No.: 781,353
[22] Filed: Oct. 25, 1991

[30] Foreign Application Priority Data

Oct. 29, 1990 [FR] France .................. 90 13381

[51] Int. Cl.$^5$ ............................................. G01T 1/185
[52] U.S. Cl. .................................. 250/374; 250/385.1
[58] Field of Search ............... 250/385.1, 374, 361 R, 250/363.01, 372, 390.11, 390.02

[56] References Cited

U.S. PATENT DOCUMENTS

| | | | |
|---|---|---|---|
| 4,286,158 | 8/1981 | Charpak et al. | 250/374 |
| 4,317,038 | 2/1982 | Charpak | 250/385.1 |
| 4,376,892 | 3/1983 | Charpak et al. | 250/374 |
| 4,429,228 | 1/1984 | Anderson | 250/374 |
| 4,465,933 | 8/1984 | Perez et al. | 250/374 |
| 4,937,455 | 6/1990 | Kurz | 250/374 |
| 5,025,162 | 6/1991 | Charpak | 250/385.1 |
| 5,032,729 | 7/1991 | Charpak | 250/374 |

FOREIGN PATENT DOCUMENTS 2637987 10/1988 France .

OTHER PUBLICATIONS

I.E.E.E. Transactions on Nuclear Science, vol. NS-34, No. 1, 1987, pp. 458-460, "Test of a BaF2-TMAE detector for positron-emission tomography".
Nuclear Instruments & Methods in Physics Research, vol. A283 No. 3, 10 1989, pp. 786-791, "Organometallic Photocathodes for parallel-plate and wire chambers".

Primary Examiner—Paul M. Dzierzynski
Assistant Examiner—Drew A. Dunn
Attorney, Agent, or Firm—Larson and Taylor

[57] ABSTRACT

An imaging device for ionizing radiation, X-rays, gamma rays, or neutrons comprises in succession: a scintillator for transposing the ionizing radiation into electromagnetic radiation ($v$) in the ultraviolet spectrum, a gas detector coupled to the scintillator and designed to respond to the received radiation by forming an avalanche A of electrons that ionize the gas thereby providing intense light that is optically detectable, An imaging system serves to record the image of the electron avalanches that ionize the gas in the gas detector The device is applicable to medical, biomedical, or industrial radiography imaging devices.

13 Claims, 3 Drawing Sheets

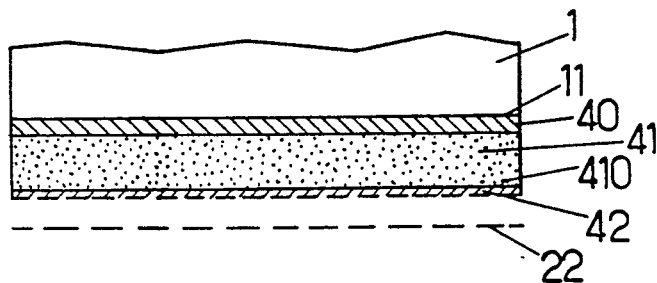
FIG.2b.
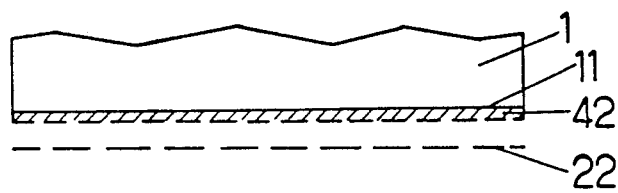
FIG.2c.
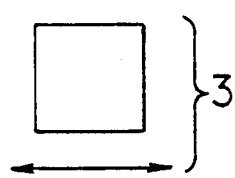
FIG.2d.
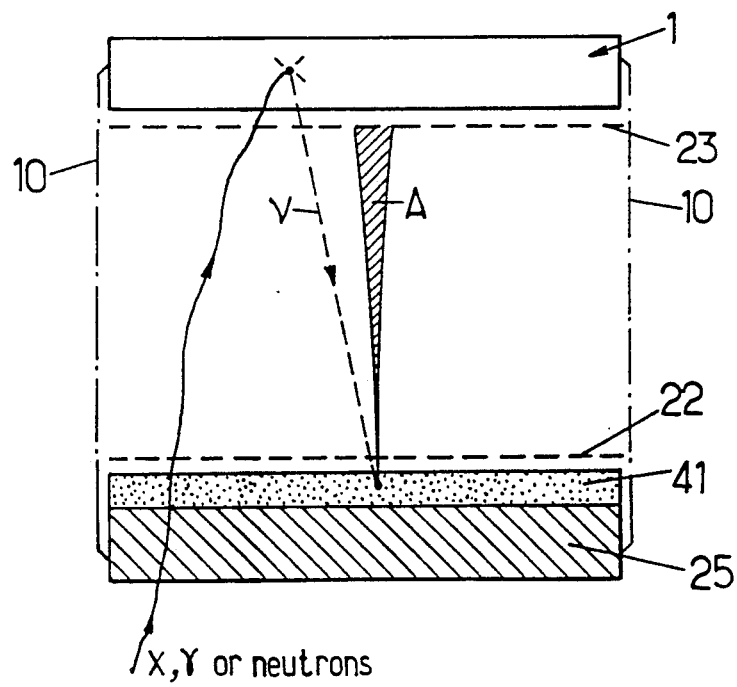

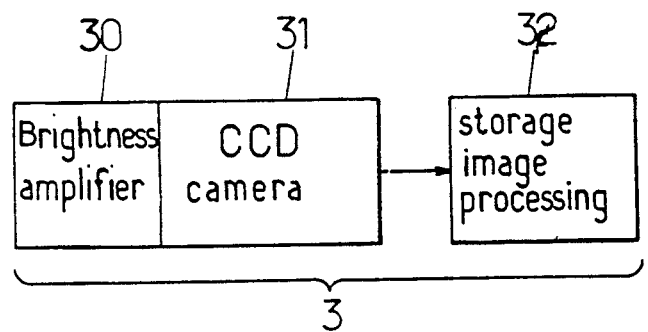
FIG.3.
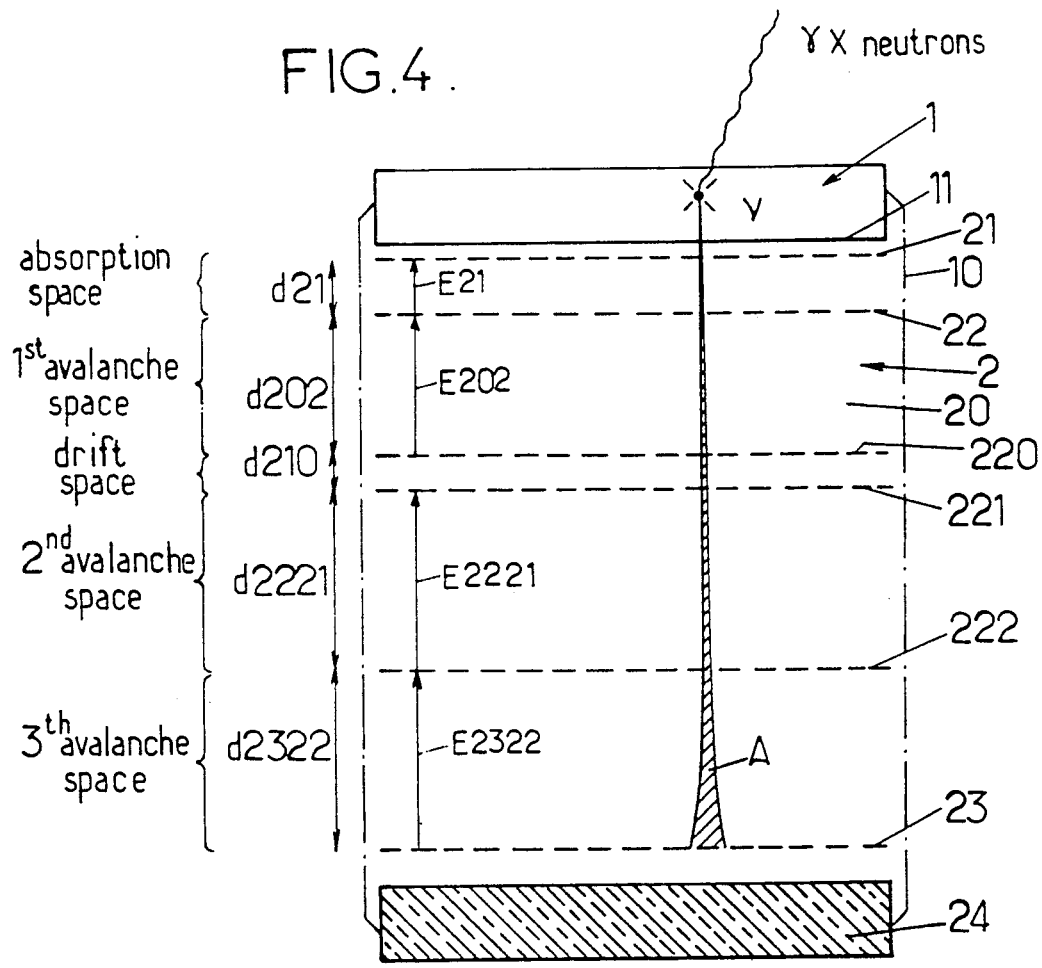
FIG.4.
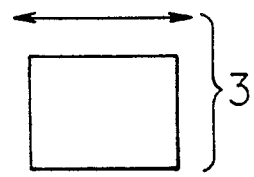

IMAGING DEVICE FOR IONIZING RADIATION

The invention relates to an imaging device for ionizing radiation such as X-rays, gamma rays, or neutrons.

In the field of medical imaging, in particular, it is desirable to be able to obtain an image of an object or of a portion of an object or of a body that may have functional unity, for example, on the basis of ionizing radiation emitted by or transmitted through said object or the corresponding portion of said object or body.

At present, in X-ray imaging, use has been made of imaging devices which comprise a scintillator coupled to the photocathode of an "image intensifier" or "brightness amplifier". In operation, apparatuses of this type give satisfaction, but they require relatively high levels of ionizing radiation to be transmitted by and thus to be absorbed by the body or body portion, since each X-ray or gamma ray absorbed in the scintillator produces only a limited quantity of light.

Other imaging devices are known that are used more particularly as laboratory instruments for the purposes of medical research or biomedical research and in which beta radiation is detected by the light produced by a gas detector under the effects of the ionization produced by the beta radiation, and of the light avalanche effect produced in the gas of the detector. A more detailed description of this type of device can usefully by obtained by reference to French patent application No. 88 13485 field in the name of the Applicant.

In the field of X-ray, gamma ray, or neutron imaging, an object of the present invention is to provide an imaging device for radiation of this type which does not have the limitations of prior devices.

Another object of the present invention is to implement an imaging device for ionizing radiation (X-rays, gamma rays, or neutrons) having very high sensitivity, and in particular an imaging device for ionizing radiation (X-rays, gamma rays, or neutrons) in which sensitivity may reach the level of detecting a quantum of energy in the detected radiation.

Another object of the present invention is to implement a corresponding X-ray, gamma ray, or neutron imaging device.

The imaging device for ionizing radiation, X-rays, gamma rays, or neutrons of the present invention is remarkable in that it comprises in succession: a scintillator for transposing the ionizing radiation into electromagnetic radiation in the ultraviolet spectrum; a gas detector coupled to the scintillator and receiving the ultraviolet spectrum electromagnetic radiation, the gas detector being designed to respond to the received radiation by forming an avalanche of electrons causing the gas to be ionized, with intense light emission taking place substantially from a point. An imaging system records an image of the electron avalanches that cause the gas in the gas detector to be ionized.

The imaging device for ionizing radiation, X-rays, gamma rays, or neutrons of the present invention is applicable to the fields of medical, biomedical, or industrial radiology.

The invention will be better understood on reading the following description and on observing the accompanying drawings, in which:

FIG. 2b shows a detail of how the photocathode shown in FIG. 2a is implemented;

FIG. 2c shows a simplified embodiment of the photocathode as shown in FIG. 2b;

FIG. 2d is a diagram of an imaging device for ionizing radiation, X-rays, gamma rays, or neutrons, in a non-limiting second variant embodiment in which a thick photocathode is used;

FIG. 3 is a block diagram of an imaging system enabling the corresponding imaging device to be implemented; and FIG. 4 shows another non-limiting variant embodiment of an imaging device for ionizing radiation in which the gas detector includes a succession of avalanche spaces.

In all of the above-mentioned figures, the relative sizes and dimensions of the various component parts are now drawn to scale, so as to facilitate understanding.

Figure 1:
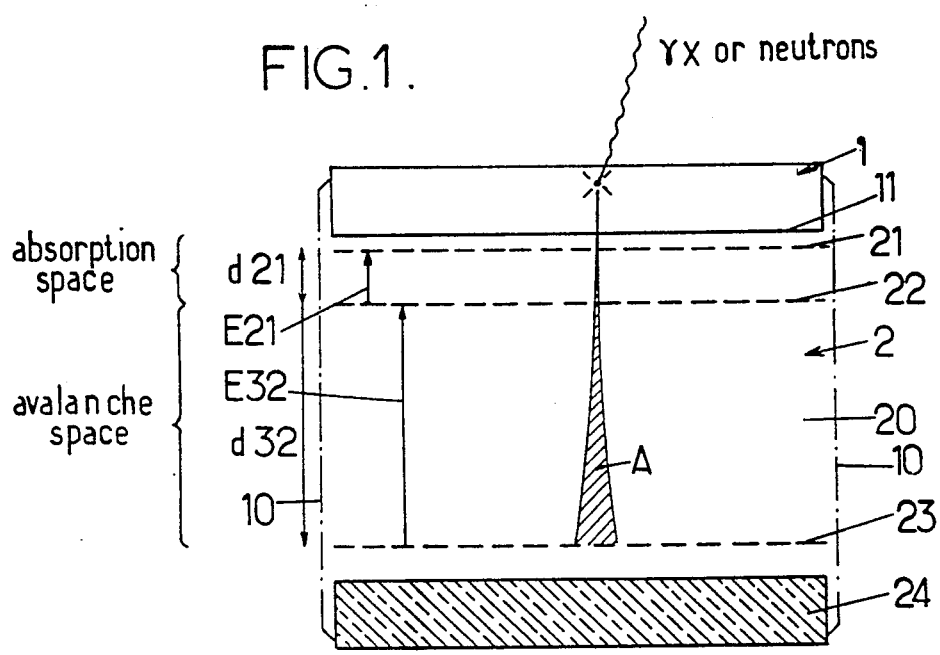
FIG. 1 is a diagram of an imaging device for ionizing radiation, X-rays, gamma rays, or neutrons of the present invention.

A more detailed description on an imaging device for ionizing radiation of the present invention is given with reference to FIG. 1.

In the above-mentioned figure, the imaging device for ionizing radiation, X-rays, gamma rays, or neutrons of the present invention comprises the following in succession: a scintillator referenced 1 for transposing the ionizing radiation, X-rays, gamma rays, or neutrons into electromagnetic radiation in the ultraviolet spectrum, and written $\nu$.

In addition, a gas detector referenced 2 is coupled to the scintillator 1 and receives the electromagnetic radiation $\nu$ in the ultraviolet spectrum. The gas detector 2 is intended to form an avalanche referenced A of electrons on receiving the electromagnetic radiation $\nu$, with the electrons ionizing the gas. In FIG. 1, the gas is referenced 20.

In addition, an imaging system referenced 3 then serves to form a record of the image of avalanches A of electrons that ionize the gas in the gas detector 2.

By way of non-limiting example, the gas detector 2 contains a gas 20 including a substance that is photo-ionizable by the photons generated by the change of wavelength from the ionizing gamma or X-radiation into the electromagnetic radiation $\nu$ in the ultraviolet spectrum.

By way of non-limiting example, the gas 20 may be constituted by a mixture of an inert gas such as helium for example and a gas such as tetrakis(dimethylamine ethylene) referred to below as TMAE, or trimethylamine, with neither of these two possibilities being limiting.

In FIG. 1 and in the following FIGS. 2a and 2d and FIG. 3, a sealed enclosure is referenced 10 and serves to hold an assembly of the scintillator 1, the gas detector 2, and the set of components it comprises, together with an outlet window referenced 24 in FIG. 1 and in FIG. 2a, or else a solid support referenced 25 whose function is described below, with the solid support 25 being shown more particularly in FIG. 2d.

Naturally the assembly made in this way, and as shown for example, in FIG. 1, may be constituted as a gastight housing, with sealing at the walls 10 and at the component parts such as the scintillator and the outlet window 24 (which outlet window may be made as a plate of quartz, for example) being provided by silicone gaskets, for example. It may be observed in particular that the gastight housing formed in this way is advantageously filled with a gas or a mixture of gases as described above at a pressure that is substantially equal to atmospheric pressure. This type of implementation should nevertheless be reserved to housings that are relatively small in size, i.e. to housings for which, by way of non-limiting example, both the scintillator 1 and the outlet window 24 are constituted by disks of a diameter not exceeding 8 cm to 10 cm.

For mechanical assemblies constituting imaging devices for ionizing radiation of the present invention and of larger dimensions, which dimensions may go up to a diameter of 40 cm to 50 cm for the scintillator and for the outlet window 24, it is preferable to feed the gas detector from a gas supply, i.e. a circuit enabling the pressure in the gas detector to be maintained slightly higher than its outlet pressure by means of a flow of gas. Such gas supplies are not described since they are commonly used in research laboratories that use gas detectors.

As to the nature of the gas 20 filling the gas detector 2, it may be observed that the above-mentioned mixture of helium and TMAE may be made so as to contain 0.05% to 2% TMAE. It will naturally be observed that the inert gas such as helium may advantageously be replaced by argon or more conventionally by methane, or even by a mixture of these gases, with these gases not being limiting since a wide range of gases can be used so long they do not interfere with the light-emitting avalanche mechanism.

The photo-ionizable substance constituted by TMAE serves firstly to absorb the ultraviolet electromagnetic radiation produced by the scintillator 1 and secondly to produce light by the phenomenon of ionizing electron avalanche, with the wavelength for TMAE under consideration being substantially equal to 480 nanometers.

Thus, as also shown in FIG. 1, the gas detector 2 comprises a first electrode 21 which is placed in the vicinity of the outlet face 11 of the scintillator. The face 11 of the scintillator is called the outlet face since it constitutes the face through which there emerges the ultraviolet radiation generated by the scintillator transposing the wavelength of the ionizing radiation, gamma rays, X-rays, or neutrons into radiation in the ultraviolet spectrum. In conventional manner, the scintillator 1 may be constituted by a parallel-face plate or disk of barium fluoride $BaF_2$, which has good transparency at the wavelengths of the radiation emitted by the scintillator and/or by the avalanche.

For neutron imaging, it is advantageous for the scintillator crystal to include elements that are particularly sensitive to neutrons, e.g. boron, lithium, or gadolinium for slow neutrons or hydrogen for fast neutrons. As shown in FIG. 1, the gas detector 2 comprises a second electrode referenced 22 placed at a distance written d21 from the first electrode 21. In operation, the second electrode 22 is subjected to an electrical potential relative to the first electrode 21 so as to establish an electric field E21 lying in the range 100 V/cm to 500 V/cm in the space between the two above-mentioned electrodes, i.e. over the distance d21. The inter-electrode space organized in this way serves to establish a space in the gap d21 for absorbing the photons delivered by the scintillator 1 and for transferring electrons.

As also shown in FIG. 1, the gas detector 2 includes a third electrode 23 at a distance d32 from the second electrode 22. This third electrode is itself subjected, in operation, to a potential enabling it to establish an electric field E32 relative to the second electrode 22 and lying, for example, in the range 5000 V/cm to 8000 V/cm, thereby creating an avalanche space for ionizations electrons in the gap d32 between the two electrodes 22 and 23. The third electrode 23 is also placed in the vicinity of the transparent outlet window 24.

The imaging device as shown in FIG. 1 operates as follows:

After ionizing radiation, X-rays, gamma rays, or neutrons has been transposed into ultraviolet radiation by the scintillator 1, the electromagnetic radiation $\nu$ is absorbed in the absorption space, with one photon of the electromagnetic radiation $\nu$ corresponding substantially to one photo-electron generated because of the presence of the photo-ionizable gas, i.e. TMAE or trimethylamine. Given the presence of the acceleration field E32 in the avalanche space, an avalanche phenomenon applicable to the electrons generated in this way is thus established, with this avalanche phenomenon causing pointlike and intense light emission by ionization of the gas in the avalanche space, with the avalanche front thus being fixed at the third electrode 23. The avalanche front thus constitutes an intense light spot which is optically detectable and which is then transmitted through the outlet window 24.

The imaging system 3 thus makes it possible to take a picture of the set of avalanche spots at the avalanche fronts generated by the initial ionizing gamma or X-ray radiation as a whole, at the scintillator 1, and then in the gas detector 2.

It will naturally be observed that advantageously the gas detector serves to increase the intensity of the electromagnetic radiation $\nu$ by a gain factor lying in the range $10^3$ to $10^4$ for the intensity of the avalanche front at the third electrode 23.

Naturally, using a conventional type of imaging system, i.e. a focusing system such as a camera, then makes it possible to detect and locate in space the impact of ionizing particles corresponding to the ionizing radiation, gamma rays, X-rays, or neutrons, with sensitivity that may be as high as detecting a single quantum of energy.

Figure 2A:
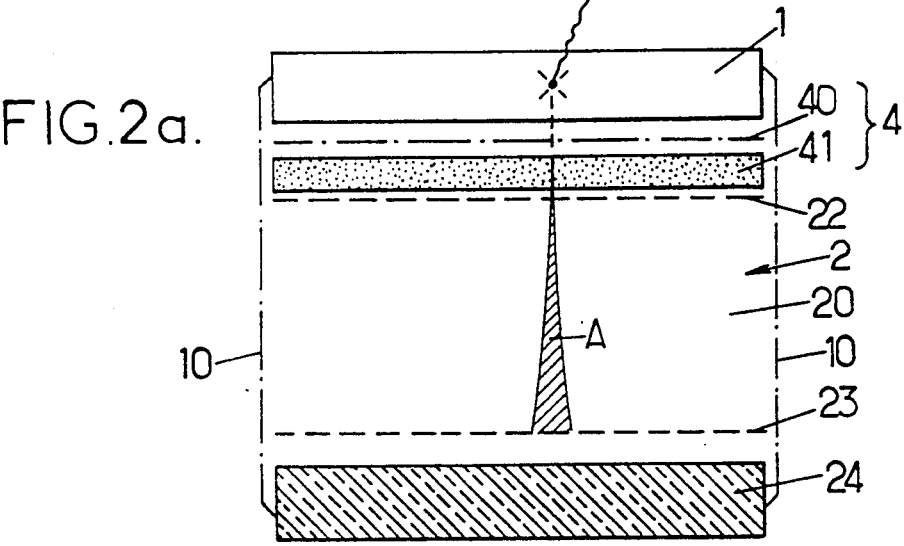
FIG. 2a is a diagram of an imaging device for ionizing radiation, X-rays, gamma rays, or neutrons, in a non-limiting first variant embodiment in which a thin type photocathode is used.

A more detailed description of one particularly advantageous embodiment of the imaging device of the present invention is now given with reference to FIG. 2a.

In the above-mentioned figure, the gas detector 2 advantageously includes a photocathode 4. The photocathode is for absorbing the photons of electromagnetic radiation $\nu$ delivered by the scintillator 1. The above-mentioned photocathode then serves to generate a large number of photoelectrons which are then accelerated like in the first embodiment shown in FIG. 1, through the above-described avalanche space.

As shown in FIG. 2a, the photocathode 4 is a thin, transparent photocathode placed substantially instead of an in the place of the first electrode 21 described with reference to FIG. 1.

Advantageously, the photocathode 4 may be disposed on the outlet face 11 of the scintillator 1. Naturally, the transparent photocathode 4 may be disposed either directly on the outlet face 11 of the scintillator crystal 1, or else on an intermediate inlet window, e.g. a quart window.

In a preferred embodiment of the above-mentioned photocathode 4, as shown in FIG. 2b, the photocathode advantageously includes the following in order in the direction of propagation of the photons of electromagnetic radiation ν delivered by the scintillator 1: a transparent metallic layer referenced 40; a photoconductive layer referenced 41; and an electrode referenced 22, which electrode is a grid that is 90% transparent, for example, to the electrons emitted by the above-mentioned photoconductive layer 41.

It will naturally be observed that the electrode 22 is placed in the vicinity of the photoconductive layer 41 and that the above-mentioned electrode 22 and transparent metallic layer 40 can then be raised to relative potentials comparable to those described with reference to FIG. 1, thereby acting respectively as the second electrode 22 and as the first electrode 21 as described above with reference to the abovementioned figure.

The transparent metallic layer 40 may preferably be constituted by a vapor phase deposit of nickel chromium alloy having a thickness lying in the range 10 Å to 30 Å, the abovementioned metallic layer is then transparent to the ultraviolet electromagnetic radiation ν emitted by the scintillator and also serves to fix the potential of the photocathode 4.

As shown in FIG. 2d, the photoconductive layer 41 may advantageously be made as a vacuum deposit of a thin layer of cesium iodide CsI having a thickness lying in the range 100 521 to 300 Å.

The photocathode 4 constituted in this way is a "semitransparent" photocathode since by way of the photoconductive layer 41 it serves to absorb the photons of electromagnetic radiation ν and to transform them into photo-electrons that are then subjected to acceleration in the avalanche space to form the avalanche phenomenon described above with reference to FIG. 1. Naturally, the above-described photocathode thus acts as a space for absorbing photons of the electromagnetic radiation ν, as described above with reference to FIG. 1.

As further shown in FIGS. 2b and 2c respectively, the photocathode 4 may be constituted by at least one ultra-thin protective layer referenced 42, formed by adsorbed ethylferrocene or TMAE vapor, for example. As shown in FIG. 2b, such a protective layer 42 may be obtained merely by adsorbing TMAE on the outlet face 410 of the photoconductive layer 41, or as shown in FIG. 2c, directly on the outlet face 11 of the scintillator 1, for example. Such a protective layer 42 is then constituted by an ultra-thin layer whose thickness may lie in the range 1 Å to 10 Å. Such a layer has the effect of protecting the photocathode when it is constituted as shown in FIG. 2b, or, as shown in FIG. 2c when the photocathode is merely constituted by the above-mentioned adsorbed layer 42 deposited directly on the outlet face 11 of the scintillator 1. Naturally, and in non-limiting manner, the single adsorbed layer 42 may also be formed on the outlet wall of an intermediate window interposed between the adsorbed layer 42 and the outlet face 11 of the scintillator 1, rather than being formed on the outlet face 11 of the scintillator 1, with the intermediate window then acting as the inlet window. The adsorbed layer 42 has the effect of increasing the efficiency of electron emission by lowering the outlet potential of the electrons either from the photocathode, or the electrons directly emitted from within the above-mentioned protective layer 42 if deposited either on the intermediate quartz window or on the outlet face 11 of the scintillator 1.

It may be observed that in general the first, second, and third electrodes referenced 21, 22, and 23 in FIGS. 1 and 2a, 2b, 2c may be formed, for example, by grids providing 90% transparency to the electrons generated either by the avalanche phenomenon or else by photons of the electromagnetic radiation ν being absorbed by the photo-ionizable substance. The purpose of these electrodes is to fix the electric potentials to the above-described determined values.

A more detailed description of another variant embodiment of a photocathode 4, a so-called "thick" photocathode, is given with reference to FIG. 2d.

In that figure, the photocathode 4 is formed by a thick photocathode replacing the third electrode 23 of FIG. 1, with the first and second electrodes 21 and 22 then being replaced by the third electrode 23, which third electrode is placed in the vicinity of the outlet face 11 of the scintillator 1. The avalanche front is then formed at this third electrode 23. In the embodiment of FIG. 2d, the scintillator 1 receiving the ionizing radiation, X-rays, gamma rays, or neutrons generates the electromagnetic radiation ν by wavelength transposition and the above-mentioned electromagnetic radiation reaches the photocathode constituted by the photoconductive layer 41 which is then deposited on a solid support 25. The avalanche phenomenon generated by the electrons delivered by the photoconductive layer 41 is then created in the avalanche space extending between the electrodes 22 and 23 as shown in FIG. 2d, i.e. substantially between the photoconductive layer 41 and the scintillator 1. The avalanche front is then directly on the electrode 23 which is acting as the third electrode and in the vicinity of the outlet face 11 of the scintillator which face is the outlet face for the ultraviolet radiation ν, with the face 11 then acting as the inlet face for the light radiation at 480 nanometers emitted by the avalanche phenomenon which is then directly transmitted without absorption by the scintillator 1 to the outside of the scintillator.

It may be observed that in the embodiment of FIG. 2d, the photoconductive layer 41 may be constituted by a so-called "thick" layer of cesium iodide CsI which may be as much as above 1 micrometer thick. The solid support 25 may be constituted by a support of aluminum or of beryllium that is transparent to X-rays, gamma rays, or neutrons, and that is of arbitrary thickness, but preferably 2 mm to 5 mm thick.

It should be observed that in general the imaging system 3 may advantageously be formed by a CCD type camera associated with a brightness amplifier. FIG. 3 shows a brightness amplifier 30 associated with a CCD camera 31 in conventional manner. In addition, and in non-limiting manner, the CCD camera may be associated with a device 32 for storing an processing images for the purpose of performing corresponding image processing.

It will naturally be observed that the imaging system 3 in the embodiments as shown in FIGS. 1 to 2c is placed in the vicinity of the third electrode 22, i.e. on the side opposite to the scintillator 1.

In contrast, it will be observed that in the embodiment as shown in FIG. 2d, the imaging system 3 is placed in the vicinity of the third electrode 23, but this time adjacent to the scintillator. In any event, the imaging system 3 is placed outside the gas chamber 2.

In general, it should be observed that the photocathodes are selected as a function of their efficiency relative to the photons emitted by the scintillator 1.

When the scintillator 1 is constituted by a parallel-face plate of $BaF_2$, the photocathode 4 may advantageously be constituted by the above-described photoconductive layer of cesium iodide 41, or else of adsorbed layers of a photosensitive substance such as TMAE like the above-mentioned layer 42, or even of ethylferrocene, for example.

The scintillators 1 may be constituted by uniform layers of barium fluoride crystals or else by rods of determined length and width adapted to the energy of the ionizing radiation under consideration.

It may be observed that the imaging system 3 can then be adapted to record the intensity of the avalanche fronts either event by event when the ionizing radiation, X-rays, gamma rays, or neutrons is at very low intensity, or else by integrating a sufficient number of events in a component of the imaging system to obtain satisfactory static accuracy and sensitivity. The way in which images are processed and whether detection is to take place event by event or by integration is then advantageously selected at the module 32 for storing and processing images. The processing is not described herein since it may be performed using conventional imaging techniques by brightness amplification coupled with CCD devices using commercially available equipment or other systems, such as the imaging systems sold by Hamamatsu and described in Hamamatsu's technical note entitled "Position analyzer" and references Hamamatsu C1816.

It may also be observed that without going beyond the scope of the present invention, the avalanche space may be constituted, in fact, by a plurality of grids in succession forming distinct avalanche spaces, with each stage between parallel grids constituting a corresponding amplification or avalanche stage, with each stage optionally being separated from the next by a drift space between two successive stages, as shown in FIG. 4. In FIG. 4, d21, d202, d210, d2221 and d2322 designate the distances separating corresponding grids 21-22, 22-220, 220-221, 221-222 and 223-23 while E21, E202, E2221 and E2322 designate corresponding electric fields, in a manner similar to the embodiment of the invention as already discussed in connection with FIG. 1.

A device for imaging ionizing radiation, X-rays, gamma rays, or neutrons has thus been described which is particularly advantageous insofar as compared with prior art devices the present device has considerably increased sensitivity, which sensitivity may be as much as 1000 times greater than that of prior art devices. The imaging device of the present invention thus makes it possible to detect and locate a single quantum of ionizing radiation energy.

It may also be observed that the imaging device of the present invention is particularly advantageous insofar as it is suitable for taking pictures over large areas with a small area brightness amplifier by using an appropriate optical system, in which case the brightness amplifier may have a diameter of 2.5 cm.

I claim:

1. An imaging device for X-rays, gamma rays, or neutrons, the device being characterized in that it comprises, in succession:
   a scintillator for transposing ionizing radiation into electromagnetic radiation in the ultraviolet spectrum;
   a gas detector coupled to said scintillator and receiving said ultraviolet spectrum electromagnetic radiation, said gas detector containing a gas and being designed to respond to the received ultraviolet radiation by forming an avalanche of electrons causing said gas to be ionized, with intense light emission taking place substantially from a point; and
   an imaging system responsive to said light emission and suitable for recording an image of electron avalanches that cause the gas in the gas detector to be ionized.

2. A device according to claim 1, characterized in that said gas detector contains a substance that is photoionizable by photons, said substance being constituted either by tetrakis or by triethylamine.

3. A device according to claim 2, characterized in that said gas detector comprises:
   a first electrode placed in the vicinity of an outlet face of the scintillator;
   a second electrode placed at a first distance from the first electrode and a means for subjecting in operation said first and second electrodes to a potential difference establishing a first electric field in the range 100 V/cm to 500 V/cm, thereby creating a photon absorption space in a gap formed by said first distance for absorbing the photons delivered by the scintillator and for transferring electrons; and
   a third electrode placed at a second distance from the second electrode and a means for subjecting in operation said second and third electrodes to a potential difference establishing a second electric field in the range 5000 V/cm to 8000 V/cm, thereby creating an avalanche space for the ionization electrons in a gap formed by said second distance, said third electrode being placed in the vicinity of a transparent outlet window with an avalanche front being created at said third electrode.

4. A device according to claim 3, characterized in that the gas detector includes a photocathode for absorbing the photons delivered by the scintillator 5. A device according to claim 4, characterized in that said photocathode is a photocathode having a thickness in the range of 10Å to 30Å acting as the first electrode.

6. A device according to claim 5, characterized in that said photocathode is transparent.

7. A device according to claim 5, characterized in that said photocathode is disposed on the outlet face of said scintillator.

8. A device according to claim 4, characterized in that said photocathode includes in succession in the propagation direction of the photons delivered by the scintillator: a transparent metallic layer; a photoconductive layer; an adjacent electrode that is transparent to the electrons emitted by the photoconductive layer, which adjacent electrode is placed adjacent to said photoconductive layer; and a means for raising said transparent metallic layer and said adjacent electrode to potentials suitable for making said metallic layer and said adjacent electrode operate, respectively, as the first electrode and as the second electrode.

9. A device according to claim 4, characterized in that said photocathode is constituted by at least one protective layer of adsorbed ethylferrocene or trimethylamine vapor and having a thickness of 1Å to 10Å.

10. A device according to claim 1, characterized in that said gas detector includes a photocathode for absorbing the photons delivered by the scintillator and an electrode placed in the vicinity of an outlet face of the scintillator, with an avalanche front being formed on said electrode.

11. A device according to claim 1, characterized in that said imaging system is a CCD camera associated with a brightness amplifier.

12. A device according to claim 5, characterized in that the imaging system is placed in the vicinity of said third electrode, on a side of said third electrode opposite to the scintillator.

13. A device according to claim 10, characterized in that said imaging system is placed in the vicinity of said electrode, on a side of said electrode adjacent said scintillator.

* * * * *